United States Patent
Kinoshita et al.

(12) 
(10) Patent No.: US 6,358,609 B2
(45) Date of Patent: *Mar. 19, 2002

(54) PROCESSED FIBER WHICH IS BONDABLE TO A RUBBER COMPOSITION AND A POWER TRANSMISSION BELT INCORPORATING THE PROCESSED FIBER

(75) Inventors: Takashi Kinoshita; Hitoshi Hasaka, both of Hyogo (JP)

(73) Assignee: Mitsuboshi Belting Ltd., Kobe (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,848

(22) Filed: Jul. 14, 1998

(30) Foreign Application Priority Data

Jul. 14, 1997 (JP) ............................................. 9-205328

(51) Int. Cl.$^7$ .............................. D02G 3/00; F16G 1/00; D06M 11/00; C09J 5/04
(52) U.S. Cl. ........................ 428/375; 428/167; 428/396; 474/242; 474/260; 474/265; 474/268; 427/434.6; 427/407; 427/386; 156/139; 156/315; 156/910; 8/115.67
(58) Field of Search .................................. 474/265, 266, 474/267, 268, 281, 242, 260, 263; 428/156, 375, 377, 380, 382, 383, 167, 396; 523/206, 205, 207, 208; 156/910, 134, 315; 152/451, 565; 8/115.67; 427/434.2, 434.6, 407.1, 385.5, 386

(56) References Cited

U.S. PATENT DOCUMENTS

| | | | |
|---|---|---|---|
| 4,031,288 A | | 6/1977 | Bhakuni et al. ............. 428/395 |
| 4,265,627 A | * | 5/1981 | Imamura ..................... 474/267 |
| 4,404,329 A | | 9/1983 | Maeda et al. ............. 525/329.2 |
| 4,762,745 A | | 8/1988 | Mashimo et al. ........... 428/252 |
| 4,978,409 A | | 12/1990 | Fujiwara ..................... 156/315 |
| 5,219,902 A | | 6/1993 | Mishima et al. ............. 523/206 |
| 5,711,734 A | * | 1/1998 | Shioyama et al. .......... 474/260 |

FOREIGN PATENT DOCUMENTS

| | | |
|---|---|---|
| JP | 18426 | 3/1990 |
| JP | 18427 | 3/1990 |
| SU | 456811 | 1/1975 |

* cited by examiner

Primary Examiner—Donald J. Loney
(74) Attorney, Agent, or Firm—Wood, Phillips, VanSanten, Clark & Mortimer (57) ABSTRACT

Processed fiber for bonding to a rubber composition. The processed fiber consists of unprocessed fiber treated with a) a first processing liquid having at least one of an isocyanate compound and an epoxy compound, b) a second processing liquid having RFL that includes at least one rubber latex selected from acrylonitrile-butadiene rubber latex and hydrogenated nitrile rubber latex, and c) a third processing liquid having rubber paste including acrylonitrile-butadiene rubber composition dissolved in a solvent and an isocyanate compound. The weight ratio of the isocyanate compound to the acrylonitrile-butadiene rubber composition is from 1/1 to 1/3. The third processing liquid has a solid content of from 3–7%.

35 Claims, 2 Drawing Sheets

PROCESSED FIBER WHICH IS BONDABLE TO A RUBBER COMPOSITION AND A POWER TRANSMISSION BELT INCORPORATING THE PROCESSED FIBER

BACKGROUND OF THE INVENTION

1. Field of the Invention

This invention relates to fibers to be bonded to a rubber composition and, more particularly, to fibers that are treated to cause effective adherence of the fibers to a rubber composition. The invention is also directed to a power transmission belt with the treated fibers incorporated therein.

2. Background Art

There has been an ongoing trend to design and produce energy-efficient automobiles. Typically, this efficiency is attributable to the compaction of these cars which is made possible, in part, by a reduction in the size of the engine compartments. This often results in a higher temperature environment in the compartments. As a result, power transmission belts used in the automobiles are often subjected to high operating temperatures.

Conventional power transmission belts are commonly made from natural rubber, styrene-butadiene rubber, and chloroprene rubber. The compression sections of the belts are prone to cracking at these high temperatures at a relatively early stage in the intended belt life.

Recently, hydrogenated nitrile rubbers have been developed as a heat-resistant polymer for use in power transmission belts, including V-belts, V-ribbed belts and toothed belts. A rubber composition with hydrogenated nitrile rubber and a metal salt of an unsaturated carboxylic acid has also been used in an elastic portion of the power transmission belts. Efforts are ongoing to improve the adhesion of fiber, load carrying cords to hydrogenated nitrile rubber.

As an example, Japanese Patent Publication (JP-B)Sho-60-24 131 discloses treatment of fiber cords with an RFL liquid that includes a carboxyl group having acrylonitrile-butadiene rubber latex.

JP-B Hei-6-41528 discloses treating cords with an epoxy compound or an isocyanate compound in a first step, treating the cords with an RFL liquid in a second step, and treating the cords with a rubber paste made from a rubber composition and a rubber chloride dissolved in a solvent in a third step.

Treating fiber cords with an RFL liquid that includes a carboxyl group having acrylonitrile-butadiene rubber latex improves adhesion of the fiber cords to hydrogenated nitrile rubber. However, it has been found through testing that, when power transmission belts incorporating the process cords are repeatedly fatigued during operation, the cords tend to peel off from the adhesion rubber layer at the interface therebetween at an early stage, demonstrating that the adhesion between the cords and rubber is unsatisfactory.

The adhesive composition consisting of an active compound, an RFL liquid, and an halogen-containing polymer has the drawback that use of the halogen-containing polymer must be limited to address environmental concerns.

The method described in JP-B Hei-6-41528 also has the drawback that the use of rubber chloride must be limited for environmental reasons. Further, the availability of this composition in the future is uncertain.

SUMMARY OF THE INVENTION

In one form, the invention is directed to processed fiber for bonding to a rubber composition. The processed fiber consists of unprocessed fiber treated with a) a first processing liquid having at least one of an isocyanate compound and an epoxy compound, b) a second processing liquid having RFL that includes at least one rubber latex selected from acrylonitrile-butadiene rubber latex and hydrogenated nitrile rubber latex, and c) a third processing liquid having rubber paste including acrylonitrile-butadiene rubber composition dissolved in a solvent and an isocyanate compound. The weight ratio of the isocyanate compound to the acrylonitrile-butadiene rubber composition is from 1/1 to 1/3. The third processing liquid has a solid content of from 3–7%.

The fiber may be treated with the second processing liquid after being treated with the first processing liquid, with the fiber being treated with the third processing liquid after being treated with the second processing liquid.

The fiber may be at least one of polyethylene terephthalate fiber (PET), polyethylene naphthalate fiber (PEN), aramid fiber, and 6-nylon.

The fiber may be treated with the first processing liquid for 0.5–30 seconds and thereafter heated at a temperature of 150–190° C. for from 2–5 minutes.

The RFL processing liquid may be a mixture of resorcinol and formalin with rubber latex in which the molar ratio of resorcinol to formalin is from 3/1 to 1/3.

The RFL processing liquid may be prepared by mixing a precondensate of resorcinol and formalin with rubber latex so that the resin content is from 5–100 parts by weight relative to 100 parts by weight of rubber content in the rubber latex and so that the solid content of the RFL processing liquid is from 5–40%.

The fiber may be treated with the second processing liquid at 5–40° C. for 0.5–30 seconds and thereafter heated at a temperature of 220–250° C. for from 1–3 minutes.

The fiber may be treated with the third processing liquid at 5–40° C. for 0.5–30 seconds and thereafter heated at a temperature of from 140–180° C. for from 3–7 minutes.

The isocyanate compound in the first processing liquid may include one of 4,4'-diphenylmethane diisocyanate, toluene 2,4-diisocyanate, polymethylene polyphenyl-diisocyanate, hexamethylene diisocyanate, polyaryl polyisocyanate, and blocked polyisocyanate prepared by reacting an isocyanate compound with a blocking agent.

The acrylonitrile-butadiene rubber composition in the third processing liquid may include acrylonitrile-butadiene rubber with at least one of a reinforcing agent, a filler, a softener, an anti-aging agent, and a vulcanization agent added thereto.

The epoxy compound in the first processing liquid may include at least one of the reaction product of at least one of polyalcohol and polyalkylene glycol, a halogen-containing epoxy compound, and a reaction product of polyphenol.

The epoxy compound in the first processing liquid may be mixed with an organic solvent.

The invention is also directed to a power transmission belt having an endless body with a length and fiber embedded in the endless body, with the fiber having the composition as described above.

The fiber may define a cord which extends lengthwise in the body.

In one form, the body has a cushion layer made from rubber and the cord is embedded in the cushion layer and extends endlessly within the body.

The compressible rubber may be made from alkylated chlorosulfonated polyethylene with a low density polyethylene that has a linear molecular structure and is chlorosulfonated to have a chlorine content of from 15–35% by weight and a sulfur content of from 0.5–2.5% by weight.

The power transmission belt may be a V-belt or a V-ribbed belt.

The power transmission belt may be a toothed belt having teeth spaced from each other lengthwise of the body, with the body having an inside layer in which the teeth are formed, and a back layer, with the cord being embedded in the back layer.

In one form, the body has a compression section with rubber that includes at least one of alkylated chlorosulfonated polyethylene (ACSM), hydrogenated nitrile rubber (H-NBR), nitrile-butadiene rubber (NBR), chloroprene rubber (CR), and chlorosulfonated polyethylene rubber (CSM).

The body may have a cushion rubber layer in which the cord is embedded with the cushion rubber layer being made from a hydrogenated nitrile rubber composition.

The hydrogenated rubber composition may include hydrogenated nitrile rubber to which is added at least one of a reinforcing agent, a filler, a softener, an anti-aging agent, a vulcanization promoter, and a vulcanizing agent.

DETAILED DESCRIPTION OF THE DRAWINGS

The rubber composition used with the present invention consists essentially of hydrogenated nitrile rubber (H-NBR), hydrogenated nitrile rubber (H-NBR) with a metal salt of an unsaturated carboxylic acid added, alkylated chlorosulfonated polyethylene (ACSM), nitrile-butadiene rubber (NBR), chloroprene rubber (CR), chlorosulfonated polyethylene rubber (CSM), or the like. These may contain a reinforcing agent such as carbon black, a filler, a softener, an anti-aging agent, a vulcanization promoter, and/or a vulcanizing agent such as sulfur, etc. The hydrogenated nitrile rubber composition is preferred.

In a preferred form, the hydrogenated nitrile rubber used herein has a degree of hydrogenation of not less than 80% and more preferably not less than 90% so as to exhibit good heat and ozone resistance. Hydrogenated nitrile rubber having a degree of hydrogenation less than 80% exhibits unsatisfactory heat resistance and ozone resistance. For purposes of oil and cold resistance, the amount of acrylonitrile bonded to the rubber is preferably from 20–45%.

Examples of fibers suitable for use with the invention are polyethylene terephthalate fiber (PET), polyethylene naphthalate fiber (PEN), aramid fiber, 6-nylon, and the like. Polyethylene terephthalate fiber, polyethylene naphthalate fiber, and aramid fiber are preferred for their good heat resistance characteristics.

The fiber may be used in any form, such as cords, woven fabrics, knitted fabrics, reed screens, etc. The fibers, processed/treated according to the present invention, are also useful as reinforcing members in dynamic products such as conveyor belts, tires, etc.

Fibers, according to the present invention, are processed/treated as described below.

First, unprocessed fiber is dipped in a first processing liquid containing an isocyanate compound and/or an epoxy compound at room temperature for 0.5–30 seconds. The liquid is then dried while being passed through an oven maintained at a temperature of from 150–190° C. for 2–5 minutes.

Next, the fiber is treated with a second processing liquid of RFL that has at least one rubber latex selected from acrylonitrile-butadiene rubber latex (NBR latex) and hydrogenated nitrile rubber latex (H-NBR latex). The RFL liquid is prepared by mixing a precondensate of resorcinol and formalin with rubber latex, in which the molar ratio of resorcinol to formalin is preferably from 3/1 to 1/3 to improve the adhesion of the processed fiber.

To prepare the RFL liquid, a precondensate of resorcinol and formalin is mixed with rubber latex so that its resin content is from 5–100 parts by weight relative to 100 parts by weight of the rubber content of the rubber latex. The overall solid content of the resulting RFL liquid is preferably from 5–40%.

The temperature of the processing liquid is maintained between 5–40° C., with the fiber being dipped for from 0.5–30 seconds. After being dipped in the processing liquid, the fiber is dried while being passed through an oven maintained at a temperature from 220–250° C. for 1–3 minutes.

The fiber is then treated with a third processing liquid having a rubber paste of an acrylonitrile-butadiene rubber composition dissolved in a solvent, and an isocyanate compound. The weight ratio of the isocyanate compound to the acrylonitrile-butadiene rubber composition is from 1/1 to 1/3. The third processing liquid preferably has a solid content of from 3–7%.

During this step, the temperature of the processing liquid is between 5–40° C. with the fiber being dipped for from 0.5–30 seconds. After the fiber is dipped in the third processing liquid, the fiber is dried while being passed through an oven maintained at a temperature of from 140–180° C. for 3–7 minutes.

The isocyanate compound in the first processing liquid may include, for example, 4,4'-diphenylmethane diisocyanate, toluene 2,4-diisocyanate, polymethylene polyphenyl-diisocyanate, hexamethylene diisocyanate, polyaryl polyisocyanate (such as that sold commercially under the trademark PAPI™), etc. The isocyanate compound is used after being mixed with an organic solvent, such as toluene, methyl ethyl ketone, etc.

Also useable are blocked polyisocyanates prepared by reacting an isocyanate compound, such as those mentioned above, with a blocking agent, such as phenols, tertiary alcohols, secondary alcohols, etc., to block the isocyanate groups of the polyisocyanate.

Examples of epoxy compound in the first processing liquid are reaction products of polyalcohol such as ethylene glycol, glycerin, pentaerythritol, and the like, or polyalkylene-glycols such as polyethylene glycol and the like, with halogen-containing epoxy compounds such as epichlorohydrin, reaction products of polyphenols such as resorcinol, bis(4-hydroxyphenyl)dimethylmethane, phenol-formaldehyde resin, resorcinol-formaldehyde resin, and the like, with halogen-containing epoxy compounds, etc. The epoxy compound is used after being mixed with an organic solvent such as toluene, methyl ethyl ketone, etc.

The RFL liquid in the second processing liquid may be prepared by mixing a precondensate of resorcinol and formalin with at least one rubber latex selected from nitrile rubber latex and hydrogenated nitrile rubber latex. The molar ratio of resorcinol to formalin is preferably from 3/1 to 1/3 to improve adhesion of the fiber processed therewith.

The precondensate of resorcinol and formalin is mixed with rubber latex so that its resin content is from 5–100 parts by weight relative to 100 parts by weight of the rubber content of the rubber latex. The overall solid content of the resulting RFL liquid is from 5–40%.

The third processing liquid may include rubber paste made from acrylonitrile-butadiene rubber composition dissolved in a solvent and an isocyanate compound. The ratio of the weight of the isocyanate compound to the acrylonitrile-butadiene rubber composition is from 1/1 to 1/3. The solid content is from 3–7%.

If the weight ratio is larger than 1/1, the pot stability of the processing liquid is not adequate so that the liquid is often solidified during the performance of the fiber processing steps. On the other hand, if the weight ratio is smaller than 1/3, adhesion of the processed fiber may not be adequate. If the solid content of the liquid is smaller than 3% or larger than 7%, the adhesive qualities of the processed fiber may not be adequate.

The solid content of the processing liquid may be measured as follows. A sample of the processing liquid is put into a metering bottle and its mass (W1) determined. The processing liquid is then put into an oven and dried until the mass of the sample becomes constant. The final mass (W2) of the sample is determined. The solid content is calculated by the following formula: W2/W1×100(%).

The acrylonitrile-butadiene rubber composition to be used herein may be any ordinary one prepared by adding to acrylonitrile-butadiene rubber a reinforcing agent such as carbon black, a filler, a softener, an anti-aging agent, a vulcanization promoter, and/or a vulcanizing agent such as sulfur, etc.

Figure 1:
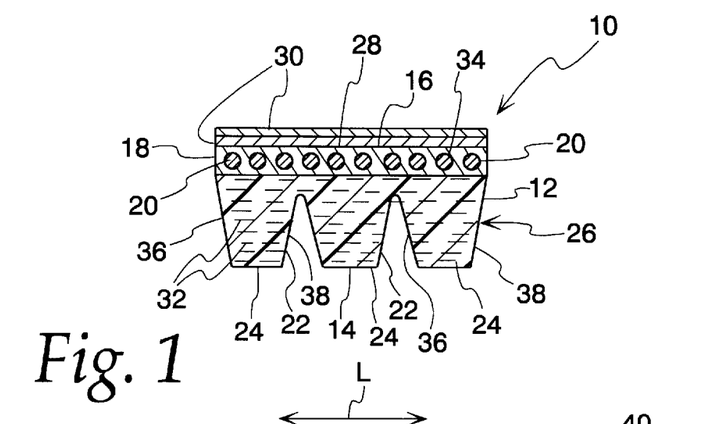
FIG. 1 is a cross-sectional view of a V-ribbed belt made according to the present invention.

In FIG. 1, a V-ribbed belt is shown at 10 as one potential environment for fibers, treated/processed according to the present invention. The V-ribbed belt 10 has a body 12 with an inside layer 14 and a back layer 16. The body 12 has a cushion rubber layer 18 in which laterally spaced load carrying cords 20 are embedded. The load carrying cords 20 extend lengthwise of the belt body 12 in an endless path. Grooves 22 are formed through the inside body layer 14 to define laterally spaced, V-shaped ribs 24. The ribs 24 are formed in a compression section 26, which in FIG. 2 resides below a neutral axis defined by the load carrying cords 20. The backside surface 28 is covered by, in this case, two layers of rubber-impregnated canvas cloth 30. The compression section 26 of the belt body 12 is reinforced by discrete, laterally extending, short fibers 32.

In this embodiment, the load carrying cords 20 are made with fibers processed according to the present invention. The load carrying cords 20 are constructed to exhibit high strength and low elongation. In this embodiment, the fibers 34 defining the cords 20 are polyethylene terephthalate fiber (PET), polyethylene naphthalate fiber (PEN), or aramid fiber.

The compression section 26 is made from a compressible rubber layer including alkylated chlorosulfonated polyethylene (ACSM), hydrogenated nitrile rubber (H-NBR), nitrile butadiene rubber (NBR), chloroprene rubber (CR), and chlorosulfonated polyethylene rubber (CSM), which exhibit good resistance to thermal deterioration.

The alkylated chlorosulfonated polyethylene is a low density polyethylene having a linear molecular structure which is chlorosulfonated to have a chlorine content of from 15–35% by weight and a sulfur content of from 0.5–2.5% by weight.

The fibers 32 may be made from nylon 6, nylon 66, polyester, cotton, or aramid. The fibers 32 resist lateral deformation of the belt body 12. By exposing the fibers 32 at the side surfaces 36, 38 of the ribs 24, friction between the surfaces 36, 38 and a cooperating pulley (not shown) which contacts the surfaces 36, 38, is reduced to thereby account for noise reduction during operation. Aramid fibers are preferred because of their stiffness, high strength, and abrasion resistance.

For maximum effect, the short aramid fibers 32 preferably have a length of from 1–20 mm and are present in an amount from 1–30 parts by weight per 100 parts by weight of rubber. Aramid fibers having aromatic rings in the molecular structure are preferred. This type of aramid fiber is available and sold commercially under the trademarks CONEX™, NOMEX™, KEVLAR™, TECHNORA™ and TWARON™.

If the amount of short aramid fibers is less than 1 part by weight, the rubber in the compression section 26 may become excessively sticky and thus prone to wearing. On the other hand, if the aramid fibers are present in an amount greater than 30 parts by weight, the fibers 32 may not uniformly disperse in the rubber in the compression section 26.

In the load carrying cords 20, the fibers 34 are preferably aramid fibers having an aromatic ring in the main chain of the molecular structure. Fibers suitable for this purpose are currently available commercially and sold under the trademarks KEVLAR™, TECHNORA™ and TWARON™.

The load carrying cords 20 may be formed by gathering 2–5 non-twisted bundles each having an overall thickness of from 300–3100 denier. Each bundle has 100–3000 monofilaments each having a thickness of from 1–3 denier. The bundles are final twisted at a count of 4–50 twists per 10 cm.

The fiber bundles may be subjected to primary and final twisting. However, primary twisting may make it difficult for RFL liquid to penetrate into the depth of the cords 20.

The cushion rubber layer 18 may be made from a hydrogenated nitrile rubber composition prepared by adding to ordinary hydrogenated nitrile rubber a reinforcing agent such as carbon black, a filler, a softener, an anti-aging agent, a vulcanization promoter, and/or a vulcanizing agents, such as sulfur, etc.

Figure 2:
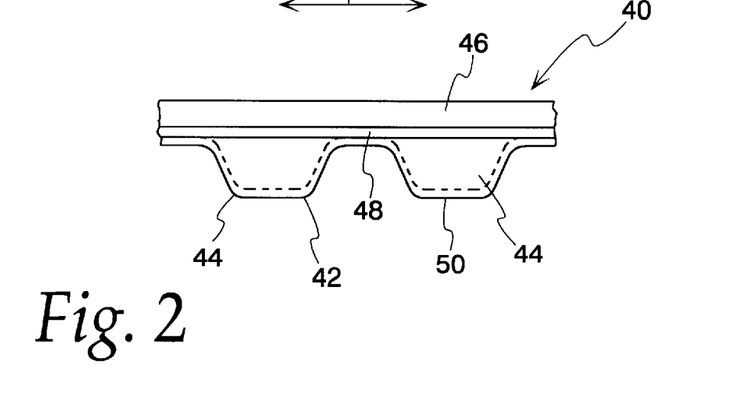
FIG. 2 is a fragmentary, side elevation view of a toothed belt, made according to the present invention.

The load carrying cords 20, as processed according to the present invention, can be used in other belts, such as the toothed belt, as shown at 40 in FIG. 2. The toothed belt 40 in FIG. 2 has a body 42 with teeth 44 formed therein and spaced lengthwise from each other, i.e. in the direction of the double-headed arrow L. The belt body 42 has a back side layer 46 having load carrying cords 48, made according to the present invention, incorporated therein. The teeth 44 are covered with a canvas layer 50.

Figure 3:
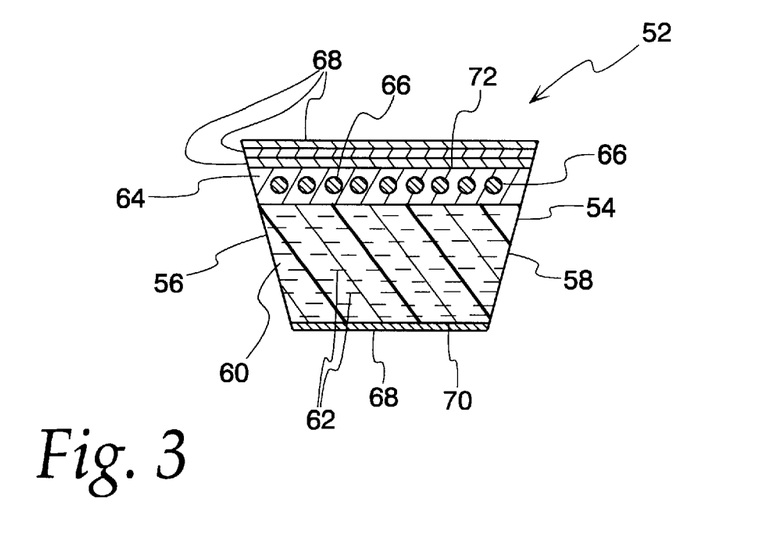
FIG. 3 is a cross-sectional view of V-belt, made according to the present invention.

In FIG. 3, the invention is shown incorporated into a V-belt 52 having a body 54 with exposed, pulley-engaging side surfaces 56, 58. The body 54 defines a compression section 60 with short, reinforcing fibers 62 embedded therein. The body 54 has a cushion rubber layer 64 with load carrying cords 66, according to the present invention, embedded therein and extending lengthwise of the belt body 54 in an endless path. A rubber-impregnated canvas cloth layer 68 is applied over the inside surface 70 of the compression section 60. Three such layers 68 are applied to the outside surface 72 of the cushion rubber layer 64.

Further examples of the present invention are described below and compared to conventional belt samples.

INVENTIVE EXAMPLES 1–5 AND
COMPARATIVE SAMPLES 1–4

The first processing liquid was prepared by combining and thoroughly mixing 10 parts by weight of PAPI-135

(polyisocyanate compound manufactured by Mitsubishi Chemical Daw Co.) and 90 parts by weight of toluene.

TABLE 1

| Chemicals | Amount (wt. pts.) |
| --- | --- |
| PAPI-135 (*1) | 10 |
| Toluene | 90 |
| Total | 100 |

(*1) Polyisocyanate compound manufactured by Mitsubishi Chemical Daw Co.

A second processing liquid as in Table 2, below, was prepared.

TABLE 2

| Chemicals | Amount (wt. pts.) |
| --- | --- |
| Resorcinol | 11.0 |
| 37% Formalin | 16.2 |
| Sodium Hydroxide (10%) | 3.0 |
| Water | 235.8 |
| NBR Latex (40%) | 250.0 |
| Ammonium Hydroxide | 11.3 |
| Water | 59.2 |
| Total | 586.5 |

11.0 parts by weight of resorcinol, 16.2 parts by weight of 37% formalin, and 3.0 parts by weight of an aqueous solution of 10% sodium hydroxide were added to 235.8 parts by weight of water. The components were filly mixed and cured at 25° C. for six hours.

In a separate operation, 59.2 parts by weight of water were added to 100 parts by weight of NBR latex (rubber content: 40%) and mixed. This mixture was then added to the resorcinol-formalin reaction liquid prepared above while the mixture was being gradually stirred, until a uniform state was achieved. The mixture was then cured at 25° C. for 20 hours to obtain the second processing liquid.

A third processing liquid which was an adhesive, nitrile rubber composition, as set out in Table 3 below, was prepared.

TABLE 3

| Chemicals | Amount (wt. pts.) |
| --- | --- |
| NBR | 100 |
| Zinc Flower | 5 |
| Stearic Acid | 1 |
| Carbon Black | 15 |
| Silicic Acid Hydrate | 30 |
| Resorcinol-Formalin Polymer | 2 |
| Promoter (MBTS) | 1.5 |
| Sulfur | 2 |
| Hexamethylol-melamine | 4 |
| Total | 160.5 |

All chemicals except sulfur were mixed in a BP model Banbury mixer in a preliminary step. The resulting mixture was formed into non-vulcanized rubber sheets using a laboratory roller to which sulfur was added. The resulting composition was then dissolved in toluene to prepare rubber paste having a solid content of from 1 to 9%. An isocyanate compound (PAPI-135) was added to this rubber paste. The ratio by weight of the isocyanate compound to the nitrile rubber composition was from 1/4 to 2/1. Ten types of the third processing liquid were thus prepared, as described in Table 4, below.

TABLE 4

| | Inventive Examples | | | Comparative Samples | |
| --- | --- | --- | --- | --- | --- |
| | 1 | 2 | 3 | 1 | 2 |
| Solid Content (%) | 3 | 5 | 7 | 1 | 9 |
| Isocyanate Compound Rubber Composition (ratio by weight) | 1/2 | 1/2 | 1/2 | 1/2 | 1/2 |

| | Inventive Examples | | Comparative Samples | |
| --- | --- | --- | --- | --- |
| | 4 | 5 | 3 | 4 |
| Solid Content (%) | 5 | 5 | 5 | 5 |
| Isocyanate Compound/Rubber Composition (ratio by weight) | 1/1 | 1/3 | 2/1 | 1/4 |

The fiber cords were processed with the processing liquids prepared above and the resulting processed fiber cords were tested for adhesion to a hydrogenated nitrile rubber composition, as set forth below. The processed fiber cords were incorporated into V-ribbed belts, which were subjected to the running tests as further described below.

Formation of Fiber Cords

Cords of polyethylene terephthalate fiber were formed using 5 bundles of 1100 denier each, and twisted at a primary twist count of 29/10 cm and a final twist count of 13/10 cm. The cords were dipped in the first processing liquid prepared above and heated at 180° C. for 5 minutes. The cords were then dipped in the second processing liquid, heated at 230° C. for 2 minutes, and finally dipped in the third processing liquid and dried at 160° for 5 minutes. For this treatment, a cord processor was used.

Adhesion Test

The processed cords were subjected to testing for adhesion to the hydrogenated nitrile rubber composition as shown in Table 5, below, to measure the force required to peel the cords from the rubber.

TABLE 5

| Chemicals | Amount (wt. pts.) |
| --- | --- |
| H-NBR | 100 |
| Zinc Flower | 5 |
| Stearic Acid | 1 |
| Carbon Black | 25 |
| Silicic Acid Hydrate | 20 |
| Resorcinol-Formalin Polymer | 2 |
| Anti-aging Agent | 2 |
| Promoter (MBTS) | 1 |
| Promoter (CM) | 1 |
| Hexamethylol-melamine | 2 |
| Sulfur | 1 |
| Total | 160 |

A plurality of the processed cords were densely aligned, side-to-side, to produce an overall width of 25 mm and pressed against the hydrogenated nitrile rubber composition at a temperature of 150° C. and a pressure of 2 kPa for 30 minutes to prepare a sheet sample having a 25 mm width, a length of 140 mm, and a thickness of 4 mm. Using a tensile tester, the peeling force of the samples was measured at room temperature and at 100° C. In addition, the test sample was thermally cured at 120° C. for 8 days and subjected to the same tensile test at room temperature. The data obtained from this testing is shown in Table 6, below, and in FIGS. 3 and 4.

TABLE 6

| Chemicals | Amount (wt. pts.) |
|---|---|
| ACSM | 100 |
| Stearic Acid | 1 |
| Magnesium Oxide-Aluminum Oxide | 10 |
| Nickel Dibutylthiocarbamate | 2 |
| Processed Oil | 8 |
| Carbon Black | 36 |
| Chopped Yarns of Aramid | 10 |
| Chopped Yarns of Nylon | 10 |
| Promoter (MBTS) | 0.5 |
| Promoter (DPTT) | 2 |

Formation of V-ribbed Belts

A sheet of plain weave fabric, having cotton warp and weft yarns, was impregnated with hydrogenated nitrile rubber having a composition shown in Table 5, through friction coating. The canvas was wound around a cylindrical mold to form a one ply canvas layer. The processed fiber cord of Example 2 was then wrapped around the mold, followed by a rubber sheet of ACSM rubber having a composition shown in Table 6. The resulting belt sleeve was vulcanized in a conventional manner at 160° C. for 30 minutes.

The vulcanized rubber sleeve was trained around spaced driving and driven rolls in a grinding assembly and rotated therearound under tension. A grinding wheel having 150 mesh diamond on its surface was pressed against the sleeve while being rotated at 1600 rpm to thereby form ribs thereon. The ribbed sleeve was removed from the grinding assembly and cut into belts of predetermined width as the sleeve was rotated. The resulting belts were K-type 3-ribbed belts having a length of 1100 mm according to the RMA Standard. The belts had a rib pitch of 3.56 mm, a rib height of 2.9 mm, and a rib angle of 40°.

Belt Running Test

The V-ribbed belts were set in a triaxial pulley system having a driving pulley and a driven pulley each with a 120 mm diameter, and a tensioning pulley having a 45 mm diameter. A tension of 830 N was imparted to the belt through the tensioning pulley. The belt was run at an ambient temperature of 85° C. with the driving pulley rotated at 4900 rpm with a load of 12 PS applied to the driven pulley.

The driven belt was observed to determine whether cracks formed in the ribs. The time before the cords in the belt popped out was also measured. The data generated is reproduced in Table 7, below.

Analysis of Data

Figure 4:
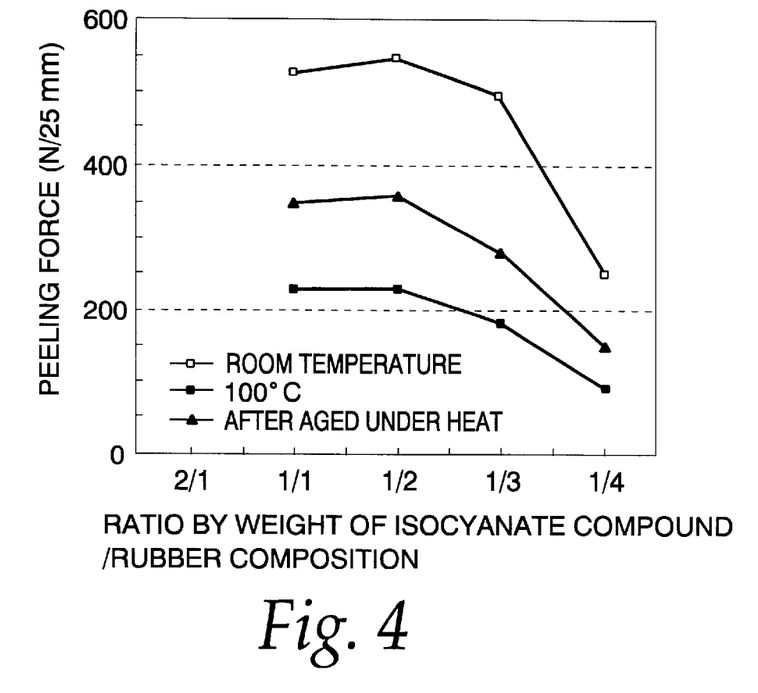
FIG. 4 is a graph showing the relationship between the weight ratio of isocyanate compound to acrylonitrile-butadiene rubber composition in processing liquid tested herein, with the liquid being controlled so as to all have a solid content of 5%, and the peeling force between rubber and fiber cords processed with the liquid.
Figure 5:
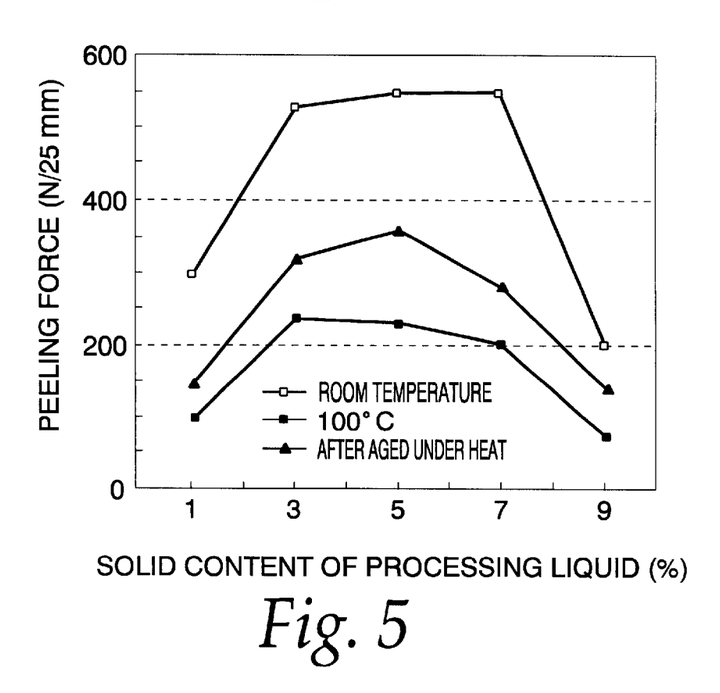
FIG. 5 is a graph showing the relationship between the solid content of the processing liquid tested herein, with the liquid being controlled so as to have a weight ratio of the isocyanate compound to acrylonitrile-butadiene rubber composition equal to one-half, and the peeling force between rubber and fiber cords processed with the liquid.

In the inventive examples, with the ratio by weight of the isocyanate compound to the nitrile rubber composition in the third processing liquid between 1/1 and 1/3, and with the solid content of the third processing liquid between 3–7%, the peeling force between the rubber and the fiber cords was high, as shown in FIGS. 4 and 5. Where the ratio by weight of the isocyanate compound to the acrylonitrile-butadiene rubber composition in the third processing liquid was larger than 2/1, the adhesive was solidified during treatment of the fibers due to its poor stability. Where the ratio was smaller than 1/3, the peeling force between the rubber and the fiber cords was greatly lowered.

It was further observed that when the solid content of the third processing liquid was smaller than 3% or larger than 7%, the peeling force between the rubber and the fiber cords was lowered.

The running tests verify that when the ratio by weight of the isocyanate compound to the acrylonitrile-butadiene rubber composition in the third processing liquid used falls between 1/1 and 1/3, and when the solid content of the third processing liquid falls between 3 and 7%, the peeling force between the fiber cords and the adhesive rubber layer in the belts is high. At the same time, the adhesive-processed cords remain flexible, with the result being that the life of the belts is long.

The present invention makes possible the manufacture of an adhesive-processed fiber having good adhesion without requiring use of a halogen containing polymer. With the fiber used in load carrying cords in a power transmission belt, long belt life may result, even with the belt operating in a high temperature environment.

The foregoing disclosure of specific embodiments is intended to be illustrative of the broad concepts comprehended by the invention.

What is claimed is:

1. A plural coated fiber suitable for bonding to a rubber composition, the plural coated fiber comprising:
   a fiber selected from the group consisting of at least one of polyethylene terephthalate fiber (PET), polyethylene naphthalate fiber (PEN), aramid fiber, and 6-nylon;
   a first coat, the first coat comprising at least one of an isocyanate compound and an epoxy compound, the first coat covering the fiber;
   a second coat, the second coat comprising RFL, the PFL comprising at least one rubber latex selected from acrylonitrile-butadiene rubber latex and hydrogenated nitrile rubber latex, the second coat covering the first coat; and
   a halogen free third coat comprising rubber paste, the rubber paste comprising acrylonitrile-butadiene rubber

TABLE 7

|  | Inventive Examples | | | | | Comparative Samples | | | |
|---|---|---|---|---|---|---|---|---|---|
|  | 1 | 2 | 3 | 4 | 5 | 1 | 2 | 3 | 4 |
| Peeling Force at room temperature (N/25 mm) | 530 | 550 | 550 | 530 | 500 | 300 | 200 | Solidified | 250 |
| Peeling Force at 100° C. (N/25 mm) | 240 | 230 | 200 | 230 | 180 | 100 | 70 | Solidified | 90 |
| Peeling Force after thermal curing (120° C. × 8 days) (N/25 mm) | 329 | 360 | 280 | 350 | 280 | 150 | 140 | Solidified | 150 |
| Life of Belt (hrs), and Cause of Failure | — | 1000 *2 | — | — | — | 72 popped out | 24 popped out | — | 72 popped out | composition dissolved in a solvent and an isocyanate compound with the weight ratio of the isocyanate compound to the acrylonitrile-butadiene rubber composition being 1/3 to 1/11 and having a dry weight solid content of from 3–7%, the third coat covering the second coat.

2. A method for providing a processed fiber which is bondable to a rubber composition, the method comprising the steps of:
(a) providing a first processing liquid comprising at least one of an isocyanate compound and an epoxy compound;
(b) providing a second processing liquid comprising RFL, the RFL having at least one rubber latex selected from acrylonitrile-butadiene rubber latex and hydrogenated nitrile rubber latex;
(c) providing a halogen free third processing liquid comprising rubber paste, the rubber paste comprising acrylonitrile-butadiene rubber composition dissolved in a solvent and an isocyanate compound with the weight ratio of the isocyanate compound to the acrylonitrile-butadiene rubber composition being 1/1 to 1/3, the third processing liquid having a dry weight solid content of from 3–7%; and
(d) treating a quantity of unprocessed fiber in turn with the first, second and third processing liquids to provide a processed fiber.

3. The method for providing processed fiber according to claim 2 wherein the unprocessed fiber of step (d) is treated with the second processing liquid after being treated with the first processing liquid and with the third processing liquid after being treated with the second processing liquid.

4. The processed fiber according to claim 2 wherein the fiber comprises at least one of polyethylene terephthalate fiber (PET), polyethylene naphthalate fiber (PEN), aramid fiber, and 6-nylon.

5. The processed fiber according to claim 2 wherein the fiber is treated with the first processing liquid for 0.5–30 seconds and thereafter heated at a temperature of 150–190° C. for from 2–5 minutes.

6. The processed fiber according to claim 2 wherein the RFL processing liquid is a mixture of resorcinol and formalin with rubber latex in which the molar ratio of resorcinol to formalin is from 3/1 to 1/3.

7. The method for providing processed fiber according to claim 6 wherein the RFL processing liquid is prepared by mixing a precondensate of resorcinol and formalin with rubber latex so that resin content is from 5 to 100 parts by weight relative to 100 parts by weight of rubber content in the rubber latex.

8. The processed fiber according to claim 7 wherein the fiber is treated with the second processing liquid at 5–40° C. for 0.5–30 seconds and thereafter heated at a temperature of 220–250° C. for from 1–3 minutes.

9. The processed fiber according to claim 2 wherein the fiber is treated with the third processing liquid at 5–40° C. for 0.5–30 seconds and thereafter heated at a temperature of from 140–180° C. for from 3–7 minutes.

10. The processed fiber according to claim 2 wherein the isocyanate compound in the first processing liquid comprises at least one of 4,4'-diphenylmethane diisocyanate, toluene 2,4-diisocyanate, polymethylene polyphenyldiisocyanate, hexamethylene diisocyanate, polyaryl polyisocyanate, and blocked polyisocyanate prepared by reacting an isocyanate compound with a blocking agent.

11. The processed fiber according to claim 2 wherein the acrylonitrile-butadiene rubber composition in the third processing liquid comprises acrylonitrile-butadiene rubber with at least one of a reinforcing agent, a filler, a softener, an anti-aging agent, and a vulcanization agent added thereto.

12. The processed fiber according to claim 2 wherein the epoxy compound in the first processing liquid comprises at least one of a reaction product of at least one of a polyalcohol and polyalkylene glycol, a halogen-containing epoxy compound, and a reaction product of polyphenol.

13. The processed fiber according to claim 2 wherein the epoxy compound in the first processing liquid is mixed with an organic solvent.

14. A power transmission belt comprising a processed fiber embedded in an endless body having a length, the processed fiber comprising:
a first coat, the first coat comprising at least one of an isocyanate compound and an epoxy compound;
a second coat, the second coat comprising RFL, the RFL having at least one rubber latex selected from acrylonitrile-butadiene rubber latex and hydrogenated nitrile rubber latex, the second coat covering the first coat; and
a halogen free third coat comprising rubber paste, the rubber paste comprising acrylonitrile-butadiene rubber composition dissolved in a solvent and an isocyanate compound with the weight ratio of the isocyanate compound to the acrylonitrile-butadiene rubber composition being 1/3 to 1/1 and having a dry wet solid content of from 3–7%, the third coat covering the second coat.

15. The transmission belt of claim 14, wherein the processed fiber comprises at least one of polyethylene terephthalate fiber (PET), polyethylene naphthalate fiber (PEN), aramid fiber, and 6-nylon.

16. The power transmission belt according to claim 14 wherein the processed fiber defines at least one cord, which extends lengthwise in the body.

17. The power transmission belt according to claim 16 wherein the body comprises a cushion layer made from rubber and the cord is embedded in the cushion layer and extends endlessly within the body.

18. The transmission belt according to claim 17 further comprising a rubber layer, the rubber layer comprising an alkylated cholorsulfonated polyethylene with a low density polyethylene that has a linear molecular structure and is chlorosulfonated to have a chlorine content of from 15–35% by weight and a sulfur content of from 0.5–2.5% by weight.

19. The power transmission belt according to claim 17 wherein the power transmission belt is one of a V-belt and a V-ribbed belt.

20. The power transmission belt according to claim 17 wherein the power transmission belt is a toothed belt having teeth spaced from each other lengthwise of the body, the body has an inside layer in which the teeth are formed and a back layer and the cord is embedded in the back layer.

21. The power transmission belt according to claim 16 wherein the fiber is treated with the second processing liquid after being treated with the first processing liquid and with the third processing liquid after being treated with the second processing liquid.

22. The power transmission belt according to claim 16 wherein the fiber comprises at least one of polyethylene terephthalate fiber (PET), polyethylene naphthalate fiber (PEN), aramid fiber, and 6-nylon.

23. The power transmission belt according to claim 21 wherein the fiber is treated with the first processing liquid for 0.5–30 seconds and thereafter heated at a temperature of 150–190° C. for from 2–5 minutes.

24. The power transmission belt according to claim 16 wherein the RFL processing liquid is a mixture of resorcinol and formalin with rubber latex in which the molar ratio of resorcinol to formalin is from 3/1 to 1/3.

25. The transmission belt according to claim 16 wherein the RFL processing liquid is prepared by mixing a precondensate of resorcinol and formalin with rubber latex so that resin content is from 5 to 100 parts by weight relative to 100 parts by weight of rubber content in the rubber latex.

26. The power transmission belt according to claim 16 wherein the fiber is treated with the second processing liquid at 5–40° C. for 0.5–30 seconds and thereafter heated at a temperature of 220–250° C. from 1–3 minutes.

27. The power transmission belt according to claim 16 wherein the fiber is treated with the third processing liquid at 5–40° C. for 0.5–30 seconds and thereafter heated at a temperature of from 140–180° C. for from 3–7 minutes.

28. The power transmission belt according to claim 16 wherein the isocyanate compound in the first processing liquid comprises at least one of 4,4'-diphenylmethane diisocyanate, toluene 2,4-diisocyanate, polymethylene polyphenyl-diisocyanate, hexamethylene diisocyanate, polyaryl polyisocyanate, and blocked polyisocyanate prepared by reacting an isocyanate compound with a blocking agent.

29. The power transmission belt according to claim 16 wherein the acrylonitrile-butadiene rubber composition in the third processing liquid comprises acrylonitrile-butadiene rubber with at least one of a reinforcing agent, a filler, a softener, an anti-aging agent, a vulcanization agent added thereto.

30. The power transmission belt according to claim 16 wherein the epoxy compound in the first processing liquid comprises at least one of a reaction product of at least one of a polyalcohol and polyalkylene glycol, a halogen-containing epoxy compound, and a reaction product of polyphenol.

31. The power transmission belt according to claim 16 wherein the epoxy compound in the first processing liquid is mixed with an organic solvent.

32. The power transmission belt according to claim 16 wherein the body has a compression section comprising rubber comprising at least one of alkylated chlorosulfonated polyethylene (ACSM), hydrogenated nitrile rubber (H-NBR), nitrile-butadiene rubber (NBR), chloroprene rubber (CR), and chlorsulfonated polyethylene rubber (CSM).

33. The power transmission belt according to claim 13 wherein the body has a cushion rubber layer in which the cord is embedded and the cushion rubber layer comprises a hydrogenated nitrile rubber composition.

34. The power transmission belt according to claim 33 wherein the hydrogenated rubber composition comprises hydrogenated nitrile rubber to which is added at least one of a reinforcing agent, a filler, a softener, an anti-aging agent, a vulcanization promoter and a vulcanizing agent.

35. A method for providing a power transmission belt, the method comprising the steps of:

(a) providing a first processing liquid comprising at least one of an isocyanate compound and an epoxy compound;

(b) providing a second processing liquid comprising RFL, the RFL comprising at least one rubber latex selected from acrylonitrile-butadiene rubber latex and hydrogenated nitrile rubber latex;

(c) providing a halogen free third processing liquid comprising rubber paste, the rubber paste comprising acrylonitrile-butadiene rubber composition dissolved in a solvent and an isocyanate compound, with the weight ratio of the isocyanate compound to the acrylonitrile-butadiene rubber composition being 1/1 to 1/3 and having a dry weight solid content of from 3–7%;

(d) treating a quantity of fiber in turn with the first, second and third processing liquids to provide a processed fiber, the fiber selected from the group consisting of at least one of polyethylene terephthalate fiber (PET), polyethylene naphthalate fiber (PEN), aramid fiber, and 6-nylon; and (e) vulcanizing the processed fiber with an endless body having a length to provide a power transmission belt.

* * * * *

UNITED STATES PATENT AND TRADEMARK OFFICE
CERTIFICATE OF CORRECTION

PATENT NO.    : 6,358,609 B2
DATED         : March 19, 2002
INVENTOR(S)   : Kinoshita et al.

It is certified that error appears in the above-identified patent and that said Letters Patent is hereby corrected as shown below:

<u>Column 11, lines 32-67, Column 12, lines 1-67 and Column 13, lines 1-3,</u>
should read as follows:

4. The method for providing processed fiber according to claim 2 wherein the fiber comprises at least one of polyethylene terephthalate fiber (PET), polyethylene naphthalate fiber (PEN), aramid fiber, and 6-nylon.

5. The method for providing processed fiber according to claim 2 wherein the fiber is treated with the first processing liquid for 0.5-30 seconds and thereafter heated at a temperature of 150-190° C. for from 2-5 minutes.

6. The method for providing processed fiber according to claim 2 wherein the RFL processing liquid is a mixture of resorcinol and formalin with rubber latex in which the molar ratio of resorcinol to formalin is from 3/1 to 1/3.

8. The method for providing processed fiber according to claim 7 wherein the fiber is treated with the second processing liquid at 5-40° C. for 0.5-30 seconds and thereafter heated at a temperature of from 140-180° C. for from 3-minutes.

9. The method for providing processed fiber according to claim 2 wherein the fiber is treated with the third processing liquid at 5-40° C. for 0.5-30 seconds and thereafter heated at a temperature of from 140-180° C. for from 3-7 minutes.

10. The method for providing processed fiber according to claim 2 wherein the isocyanate compound in the first processing liquid comprises at least one of 4,4'-diphenylmethane diisocyanate, toluene 2,4-diisocyanate, polymethylene polyphenyl-diisocyanate, hexamethylene diisocyanate, polyacryl polyisocyanate, and blocked polyisocyanate prepared by reacting an isocyanate compound with a blocking agent.

11. The method for providing processed fiber according to claim 2 wherein the acrylonitrile-butadiene rubber composition in the third processing liquid comprises acrylonitrile-butadiene rubber with at least one of a reinforcing agent, a filler, a softener, an anti-aging agent, and a vulcanization agent added thereto.

UNITED STATES PATENT AND TRADEMARK OFFICE
CERTIFICATE OF CORRECTION

PATENT NO. : 6,358,609 B2
DATED : March 19, 2002
INVENTOR(S) : Kinoshita et al.

It is certified that error appears in the above-identified patent and that said Letters Patent is hereby corrected as shown below:

<u>Column 11, lines 32-67, Column 12, lines 1-67 and Column 13, lines 1-3, (cont.)</u>
12. The method for providing processed fiber according to claim 2 wherein the epoxy compound in the first processing liquid comprises at least one of a reaction product of at least one of a polyalcohol and polyalkylene gycol, a halogen-containing epoxy compound, and a reaction product of polyphenol.

13. The method for providing processed fiber according to claim 2 wherein the epoxy compound in the first processing liquid is mixed with an organic solvent.

15. The power transmission belt of claim 14, wherein the processed fiber comprises at least one of polyethylene terephthalate fiber (PET), polyethylene naphthalate fiber (PEN), aramid fiber, and 6-nylon.

18. The power transmission belt according to claim 17 further comprising a rubber layer, the rubber layer comprising an alkylated chlorosulfonated polyethylene with a low density polyethylene that has a linear molecular structure and is chlorosulfonated to have a chlorine content of from 15-35% by weight and a sulfur content of from 0.5-2.5% by weight.

25. The power transmission belt according to claim 16 wherein the RFL processing liquid is prepared by mixing a precondensate of resorcinol and formalin with rubber latex so that resin content is from 5 to 100 parts by weight relative to 100 parts by weight of rubber content in the rubber latex.

Signed and Sealed this

Thirty-first Day of May, 2005

JON W. DUDAS
*Director of the United States Patent and Trademark Office*